US010511920B2

United States Patent
Haubrich et al.

(10) Patent No.: US 10,511,920 B2
(45) Date of Patent: Dec. 17, 2019

(54) EAR-WORN ELECTRONIC DEVICE INCORPORATING DIRECTIONAL MAGNETIC ANTENNA

(71) Applicant: Starkey Laboratories, Inc., Eden Prairie, MN (US)

(72) Inventors: Greg Haubrich, Champlin, MN (US); Nikhil Nilakantan, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/952,438

(22) Filed: Apr. 13, 2018

(65) Prior Publication Data

US 2019/0320269 A1 Oct. 17, 2019

(51) Int. Cl.
*H04R 25/00* (2006.01)
*H04B 5/00* (2006.01)
(Continued)

(52) U.S. Cl.
CPC ........... *H04R 25/554* (2013.01); *H01Q 1/273* (2013.01); *H01Q 1/526* (2013.01); *H01Q 7/08* (2013.01); *H04B 5/0006* (2013.01); *H04R 25/456* (2013.01); *H04R 25/65* (2013.01); *H04R 2225/025* (2013.01); *H04R 2225/51* (2013.01)

(58) Field of Classification Search
CPC ...... H04B 5/0006; H01Q 1/273; H01Q 1/526; H01Q 7/08; H04R 25/65; H04R 25/456; H04R 25/554; H04R 2225/025; H04R 2225/51
See application file for complete search history.

(56) References Cited

U.S. PATENT DOCUMENTS 6,246,231 B1 6/2001 Ashe
6,528,991 B2 3/2003 Ashe
(Continued)

FOREIGN PATENT DOCUMENTS

EP 122814 8/2001
WO WO2013184246 12/2013

OTHER PUBLICATIONS

Galster, "A new method for wireless connectivity in hearing aids", 2010, 5 pages.

*Primary Examiner* — Brian Ensey
(74) *Attorney, Agent, or Firm* — Mueting, Raasch & Gebhardt, P.A.

(57) ABSTRACT

An ear-worn electronic device includes a housing comprising a first end and an opposing second end, a first side and an opposing second side, and the first and second sides extending between the first and second ends. The first side is configured to contact the wearer's head. A battery is disposed within the housing proximate the first end. An acoustic receiver or an acoustic receiver connector is disposed within the housing proximate the second end. Electronics including a near-field magnetic induction (NFMI) radio are disposed in the housing. A directional magnetic antenna is situated in or on the housing and coupled to the NFMI radio. The antenna comprises a core having a complex shape and a coil wound around a portion of the core. The core comprises a closed end oriented toward a source of magnetic noise and an open end oriented away from the source of magnetic noise.

20 Claims, 12 Drawing Sheets

(51) Int. Cl.
  *H01Q 7/08* (2006.01)
  *H01Q 1/52* (2006.01)
  *H01Q 1/27* (2006.01)

(56) References Cited

U.S. PATENT DOCUMENTS

| | | |
|---|---|---|
| 8,432,167 B2 | 4/2013 | Reiderman |
| 9,521,494 B2 | 12/2016 | Nikles |
| 9,980,062 B2* | 5/2018 | Fischer ................ H04R 25/554 |
| 2005/0168396 A1 | 8/2005 | Victorian et al. |
| 2008/0226108 A1 | 9/2008 | Heerlein et al. |
| 2009/0274328 A1 | 11/2009 | Gebhardt et al. |
| 2010/0195857 A1 | 8/2010 | Gebhardt et al. |
| 2011/0106210 A1* | 5/2011 | Meskens ................ H01Q 1/125 |
| | | 607/57 |
| 2013/0188803 A1 | 7/2013 | Shaanan et al. |
| 2014/0185848 A1 | 7/2014 | Ozden et al. |
| 2015/0146900 A1 | 5/2015 | Vonlanthen et al. |
| 2018/0146309 A1* | 5/2018 | Gulstorff ............... H04R 25/554 |
| 2018/0219273 A1* | 8/2018 | Kerselaers ........... H01Q 1/2283 |

\* cited by examiner

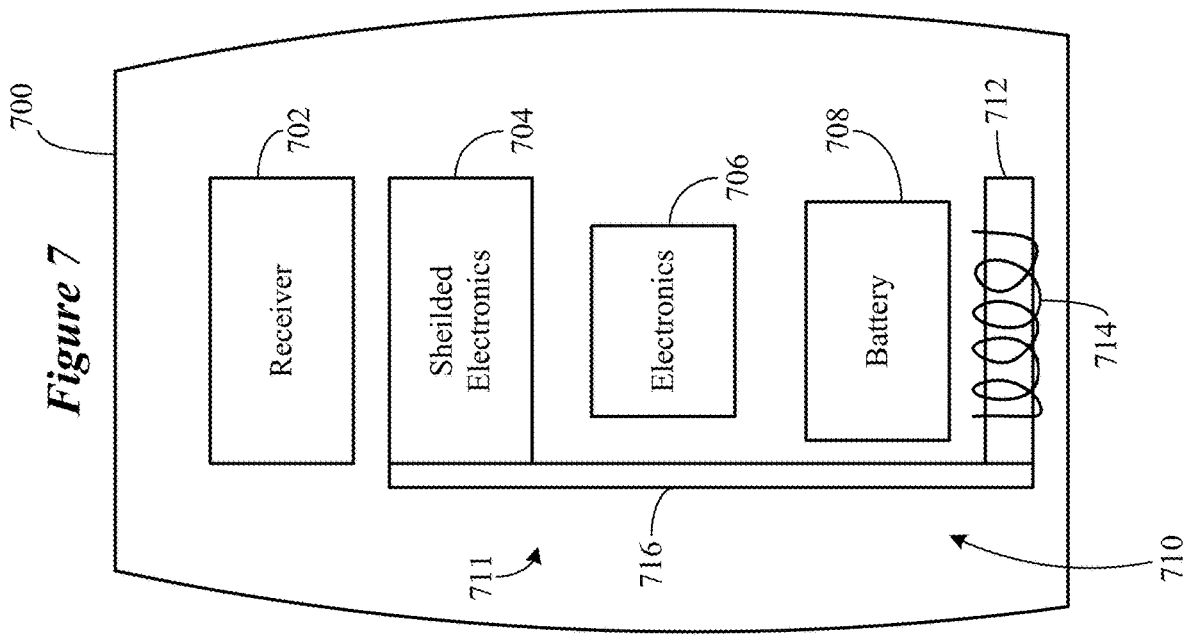
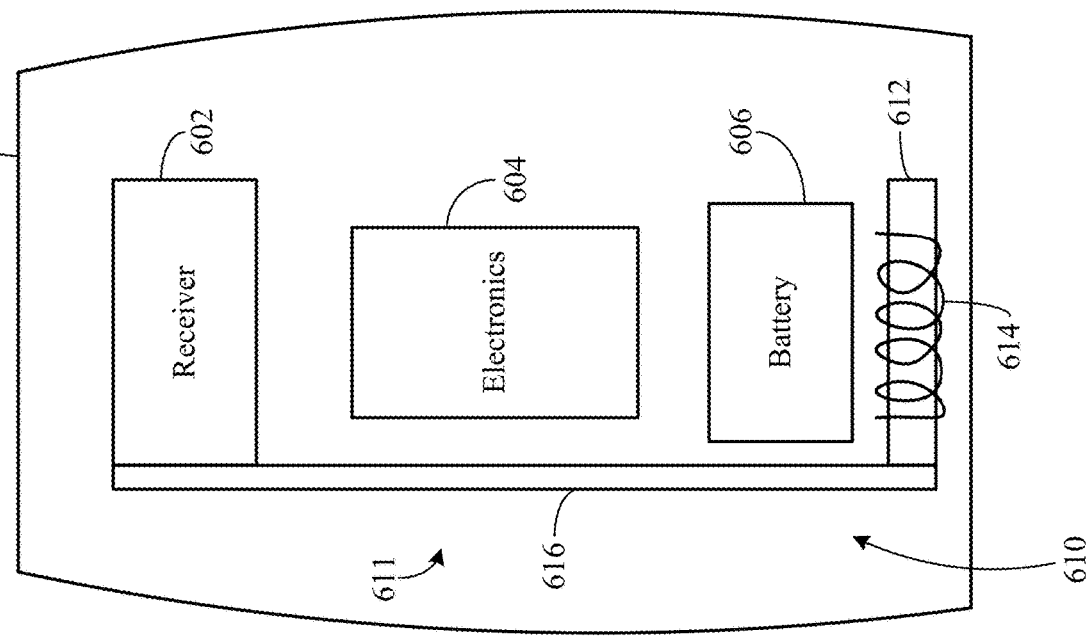

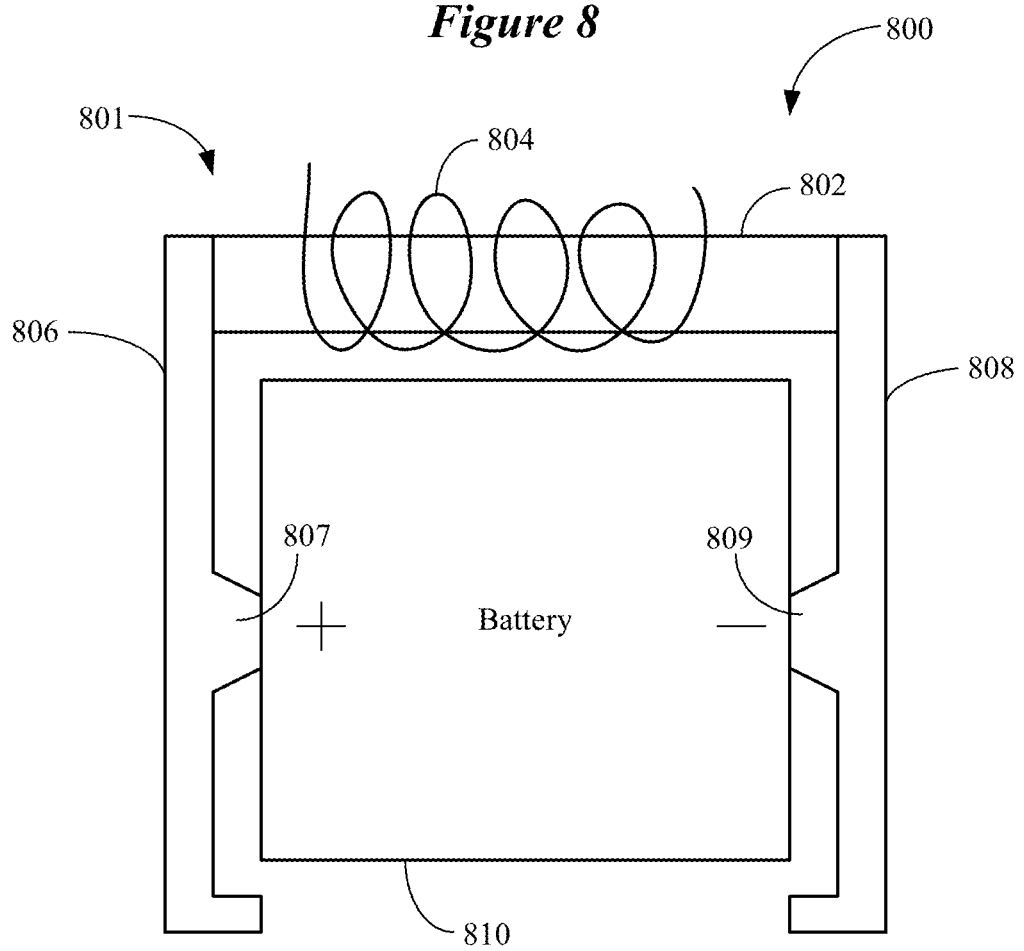

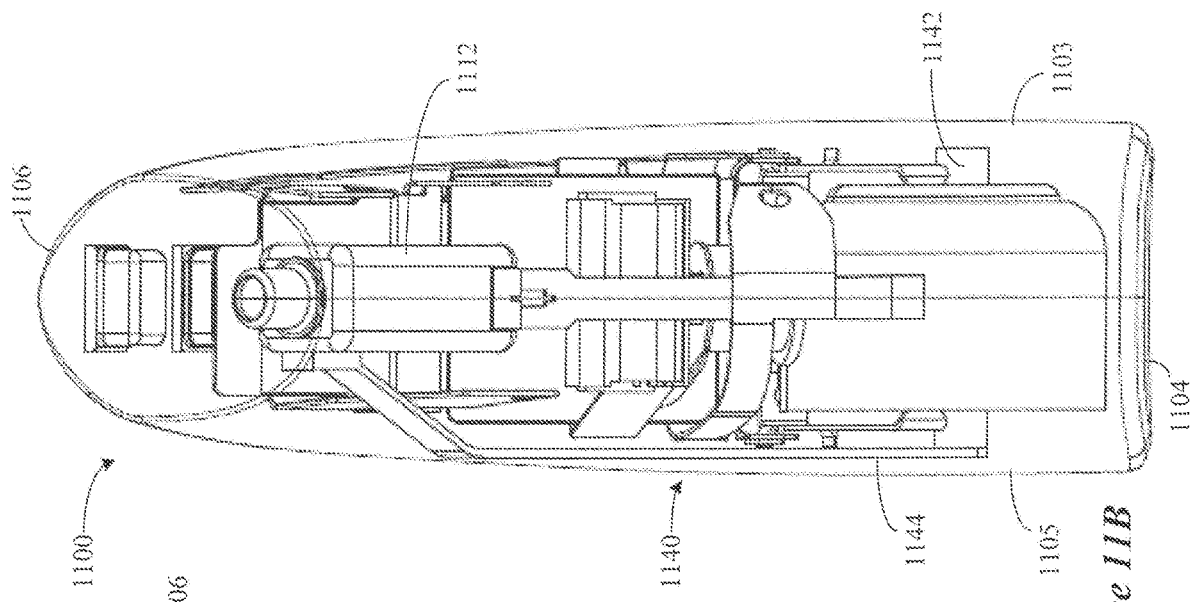
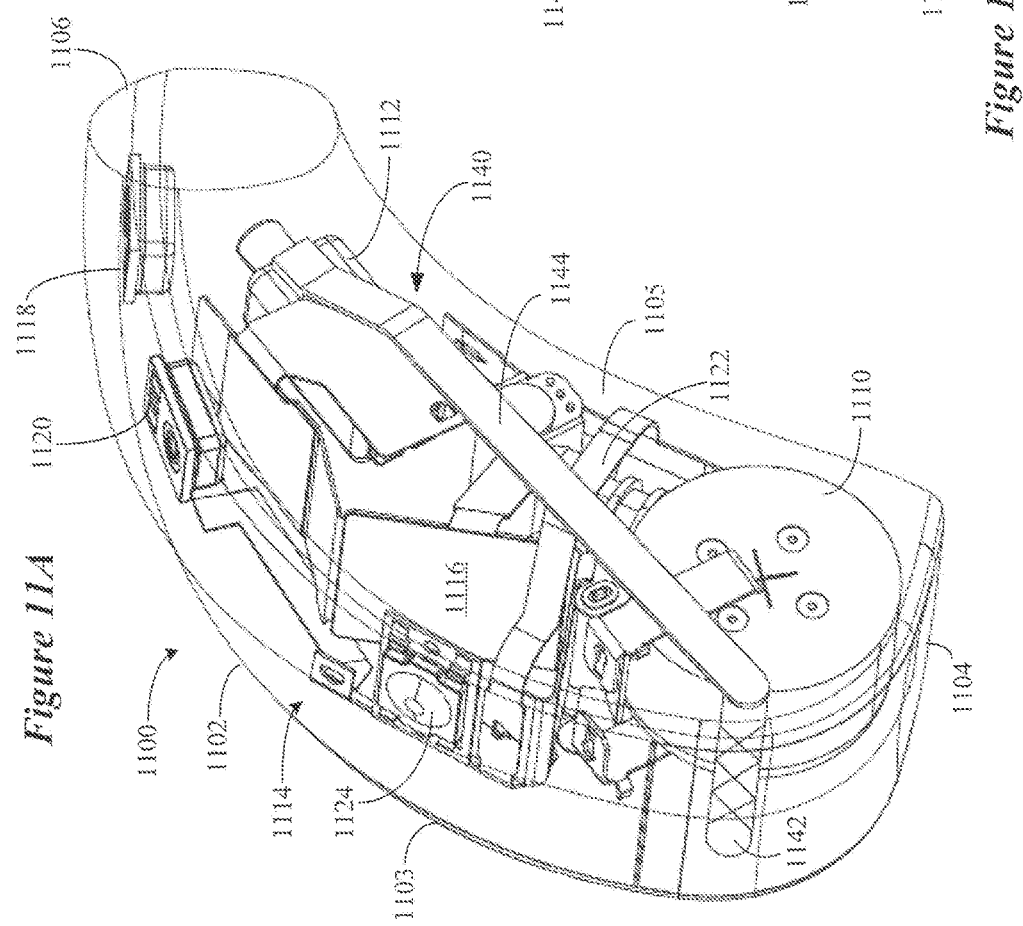
Figure 11A
Figure 11B

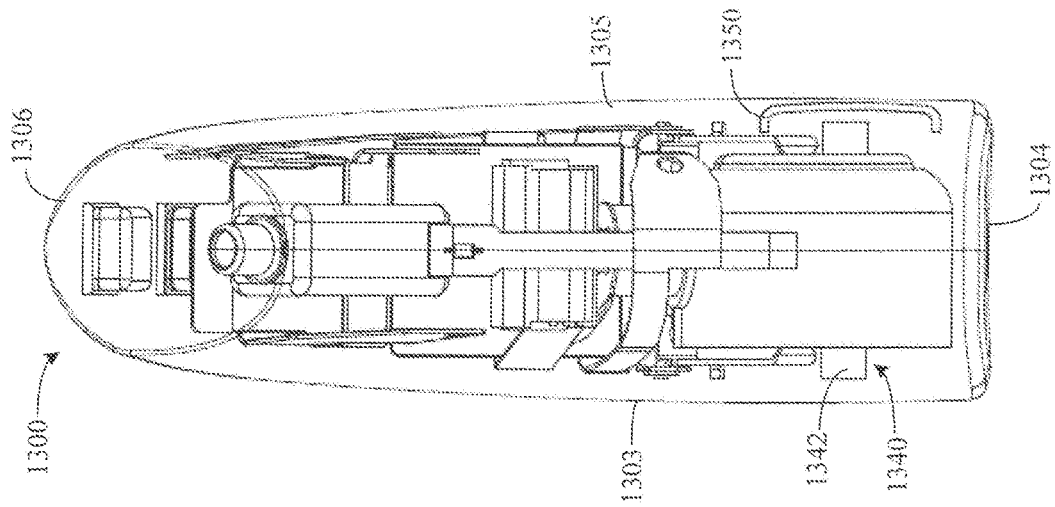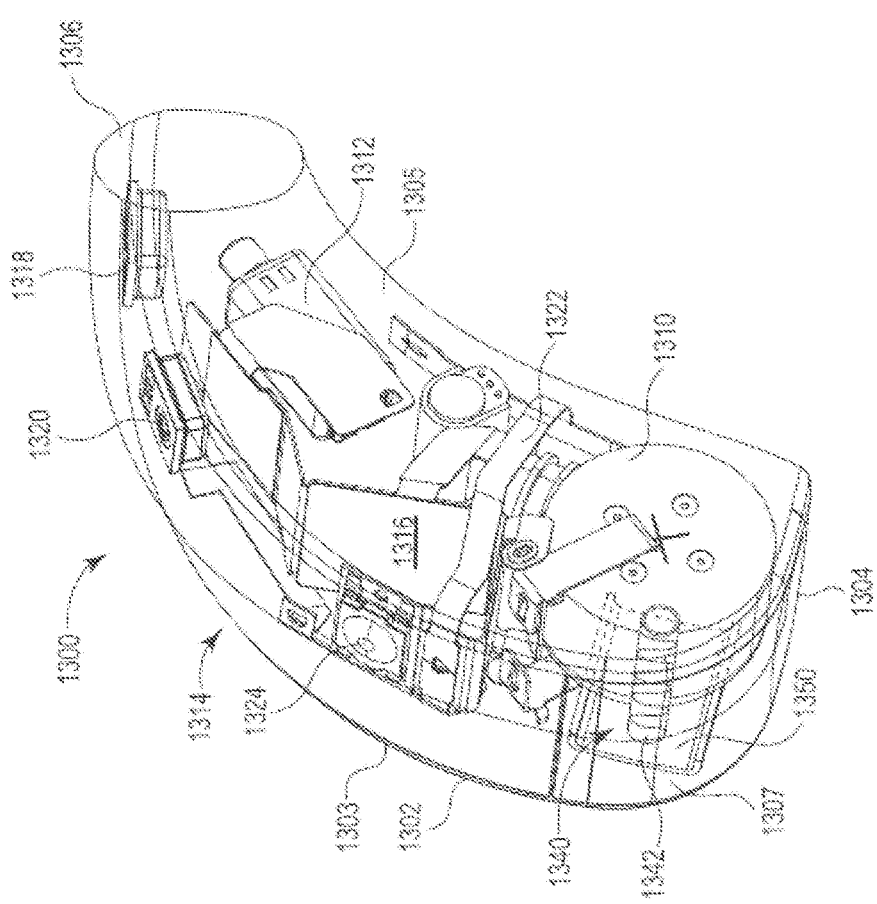

EAR-WORN ELECTRONIC DEVICE INCORPORATING DIRECTIONAL MAGNETIC ANTENNA

TECHNICAL FIELD

This application relates generally to hearing devices, including ear-worn electronic devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. Hearing devices may be capable of performing wireless communication between a pair of hearing devices and with other devices, via short-range and long-range communication links.

SUMMARY

Various embodiments are directed to an ear-worn electronic device configured to be worn by a wearer. The device includes a housing comprising a first end and an opposing second end, a first side and an opposing second side, and the first and second sides extending between the first and second ends. The first side is configured to contact the wearer's head. A battery is disposed within the housing proximate the first end. An acoustic receiver or an acoustic receiver connector is disposed within the housing proximate the second end. Electronics including a near-field magnetic induction (NFMI) radio are disposed in the housing. A directional magnetic antenna is situated in or on the housing and coupled to the NFMI radio. The antenna comprises a core having a complex shape and a coil wound around a portion of the core. The core comprises a closed end oriented toward a source of magnetic noise and an open end oriented away from the source of magnetic noise.

According to other embodiments, an ear-worn electronic device configured to be worn by a wearer includes a housing comprising a first end and an opposing second end, a first side and an opposing second side, and the first and second sides extending between the first and second ends. The first side is configured to contact the wearer's head. A battery is disposed within the housing proximate the first end. An acoustic receiver or an acoustic receiver connector is disposed within the housing proximate the second end. Electronics including a near-field magnetic induction (NFMI) radio are disposed in the housing. A magnetic antenna is situated in or on the housing and coupled to the NFMI radio. The antenna comprises a core and a coil wound around a portion of the core. A magnetic shield is positioned between the antenna and a region of the second side of the housing. The magnetic shield is configured as a low reluctance path to a source of magnetic noise impinging on the second side of the housing.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 6 shows a directional magnetic antenna having a core comprising an existing high permeability component of an ear-worn electronic device in accordance with various embodiments;

FIG. 7 shows a directional magnetic antenna having a core comprising an existing high permeability component of an ear-worn electronic device in accordance with various embodiments;

FIG. 8 shows a directional magnetic antenna having a core with a complex shape that partially encompasses a battery of an ear-worn electronic device in accordance with various embodiments;

FIGS. 11A and 11B illustrate an ear-worn electronic device comprising a directional magnetic antenna in accordance with various embodiments;

FIGS. 13A and 13B illustrate an ear-worn electronic device comprising a magnetic antenna and a magnetic shield in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
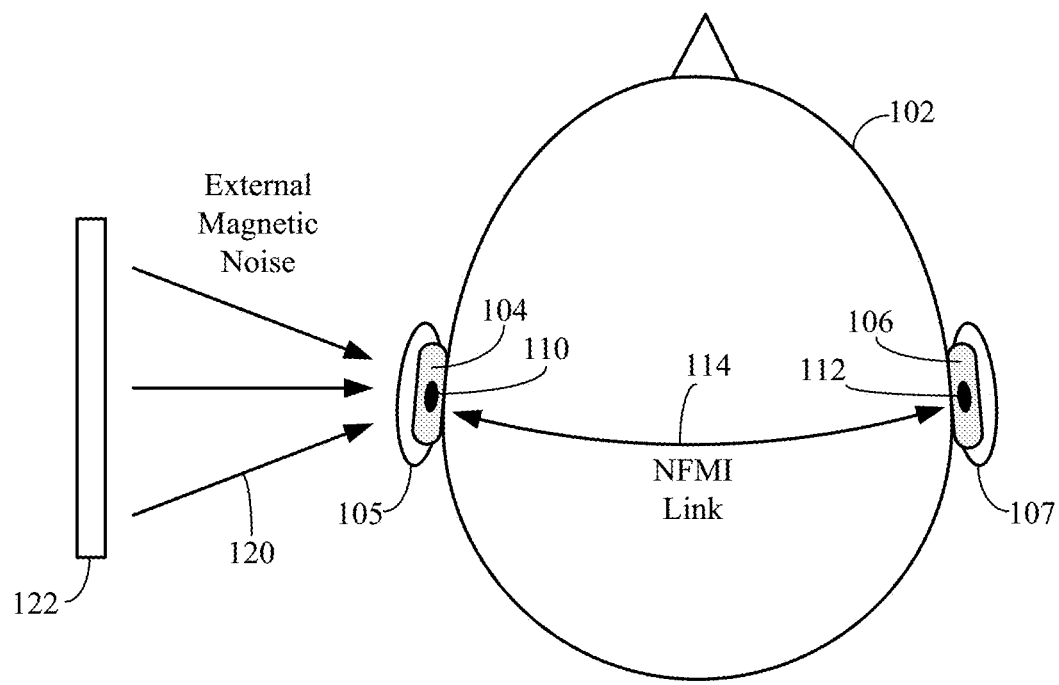
FIG. 1 shows left and right devices of an ear-worn electronic system, each of which incorporates near-field magnetic induction (NFMI) communication circuitry in accordance with various embodiments.

It is understood that the embodiments described herein may be used with any ear-worn electronic device without departing from the scope of this disclosure. The devices depicted in the figures are intended to demonstrate the subject matter, but not in a limited, exhaustive, or exclusive sense. Ear-worn electronic devices, such as hearables (e.g., wearable earphones, ear monitors, and earbuds), hearing aids, and hearing assistance devices, typically include an enclosure, such as a housing or shell, within which internal components are disposed. Typical components of an ear-worn electronic device can include a digital signal processor (DSP), memory, power management circuitry, one or more communication devices (e.g., a near-field communication device, a long-range communication device), one or more antennas, one or more microphones, and a receiver/speaker, for example. Near-field magnetic induction communication circuitry can be implemented to facilitate communication between a left ear device and a right ear device. Ear-worn electronic devices can also incorporate a long-range communication device, such as a Bluetooth® transceiver or other type of radio frequency (RF) transceiver.

Ear-worn electronic devices of the present disclosure incorporate NFMI communication circuitry comprising a directional magnetic antenna coupled to an NFMI radio. The NFMI communication circuitry facilitates near-field ear-to-ear communication between a pair of ear-worn electronic devices worn by a wearer. The NFMI communication circuitry can also facilitate near-field communication between an ear-worn electronic device and NFMI communication circuitry of an external device or system in close proximity (e.g., ~1 m) to the ear-worn electronic device.

In addition to NFMI communication circuitry, ear-worn electronic devices of the present disclosure can incorporate long-range communication circuitry comprising an antenna arrangement coupled to a high-frequency radio, such as a 2.4 GHz radio. The radio can conform to an IEEE 802.11 (e.g., WiFi®) or Bluetooth® (e.g., BLE, Bluetooth® 4. 2 or 5.0) specification, for example. It is understood that hearing devices of the present disclosure can employ other radios, such as a 900 MHz radio. Ear-worn electronic devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Ear-worn electronic devices of the present disclosure can be configured to effect bi-directional communication (e.g., wireless communication) of data with an external source, such as a remote server via the Internet or other communication infrastructure.

The term ear-worn electronic device of the present disclosure refers to a wide variety of ear-level electronic devices that can aid a person with impaired hearing. The term ear-worn electronic device also refers to a wide variety of devices that can produce optimized or processed sound for persons with normal hearing. Ear-worn electronic devices of the present disclosure include hearables (e.g., wearable earphones, headphones, earbuds, virtual reality headsets), hearing aids (e.g., hearing instruments), cochlear implants, and bone-conduction devices, for example. Ear-worn electronic devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to an "ear-worn electronic device," which is understood to refer to a system comprising one of a left ear device and a right ear device or a combination of a left ear device and a right ear device. A combination of a left ear device and a right ear device is also referred to herein as an ear-worn electronic system.

FIG. 1 illustrates left and right ear-worn electronic devices 104, 106 supported on or in left and right ears 105, 107 of a wearer 102. The left and right ear-worn electronic devices 104, 106 incorporate NFMI communication circuitry 110, 112. Ear-to-ear communication between the left and right ear-worn electronic devices 104, 106 is supported by an NFMI communications link 114 established between NFMI communication circuitry 110, 112.

Wireless communication through NFMI utilizes a high frequency carrier with digital modulation. The range of frequencies used in ear-worn electronic devices of the present disclosure for NFMI data transmission typically falls between 3 and 15 MHz (e.g., 3-11 MHz).

There are several benefits to using NFMI technology in ear-worn electronic devices. For example, the hardware used in NFMI data transmission is well established, making it accessible for use in different types of ear-worn electronic devices. Notably, NFMI operates within a frequency band that easily propagates through the human head and body. This ease of propagation allows for ear-to-ear communication between left and right ear-worn electronic devices 104, 106, providing the convenience of synchronized adjustments to memory or volume, as well as the benefits of binaural signal processing between left and right ear-worn electronic devices. Ear-to-ear communication via an NFMI communications link also allows unidirectional audio for facilitating phone calls to be heard in both ears. Also, the limited range of NFMI data transmission provides a region of secured communications in close proximity to the wearer 102, reducing the risk of eavesdropping.

NFMI communication has a limited range due to its use of magnetic signal transmission, which results in a wireless signal that degrades quickly. Specifically, the magnetic signal degrades approximately proportionally to the inverse of the transmission distance cubed, whereas with far-field or long-distance transmission methods (e.g., 900-Mhz and 2.4-GHz), signals degrade at a rate proportional to the inverse of the distance. For this reason, ear-worn electronic devices that use NFMI have a transmission range that falls within about 1 meter of the ear-worn electronic devices.

FIG. 1 shows a source 122 of external magnetic noise 120 that can negatively impact the ear-to-ear magnetic communications link established between the left and right NFMI communication circuitry 110, 112. The source 122 of external magnetic noise 120 can be, for example, a display of a smartphone. During a phone call, for example, the wearer 102 holds the smartphone 122 against or near his or her ear 105, bringing the source 122 of external magnetic noise 120 into the immediate vicinity of the left NFMI communication circuitry 110. The external magnetic noise 120 in this scenario degrades the NFMI communications link 114 established between the left and right NFMI communication circuitry 110, 112 (e.g., by reducing the signal-to-noise ratio).

Embodiments of the disclosure are directed to an ear-worn electronic device which incorporates a directional magnetic antenna, exclusive of or in combination with a magnetic shield. Some embodiments are directed to an ear-worn electronic device which incorporates a directional magnetic antenna configured to preferentially respond to the magnetic fields in one direction versus another, thereby maintaining or enhancing existing NFMI link budget or margin. Further embodiments are directed to an ear-worn electronic device which incorporates a directional magnetic antenna configured to have a lower response to noisy/undesired external and internal magnetic fields within the operating frequency band of the ear-worn electronic system's NFMI arrangement. This mitigates NFMI link degradation by reducing the degradation in Signal-to-Noise Ratio (SNR) due to this magnetic field noise. The rejection in the indicated embodiments is spatial in nature (e.g., the direction of the desired and undesired magnetic fields are used to configure the NFMI coil's core per this disclosure). Some embodiments of an ear-worn electronic device incorporate a directional magnetic antenna in combination with a magnetic shield configured to redirect magnetic noise away from the preferred direction of the NFMI coil response. It is understood that, because reciprocity applies, a transmitted magnetic field would have similar directional properties given an applied NFMI coil voltage or current.

Figure 2:
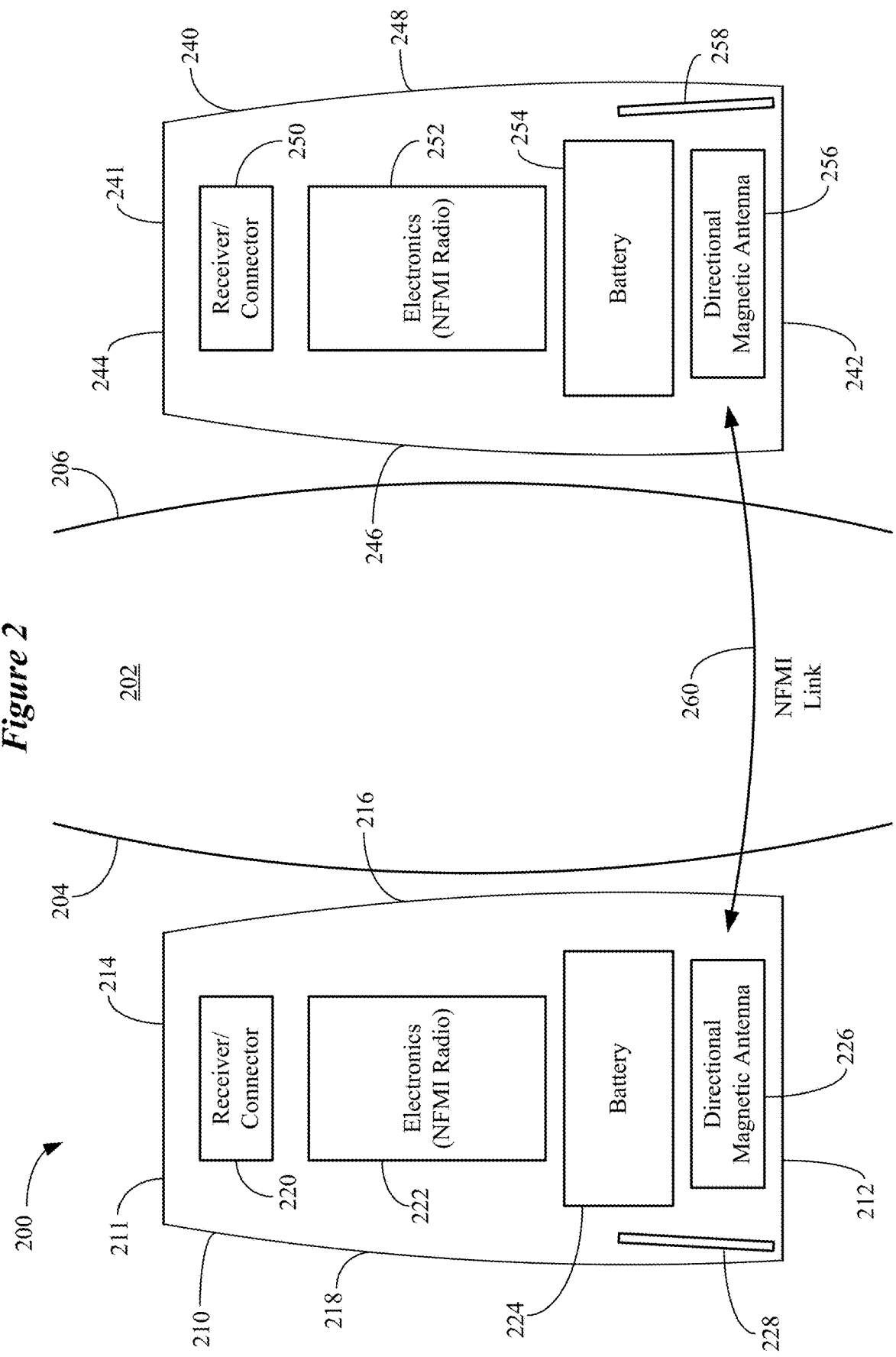
FIG. 2 illustrates an ear-worn electronic system comprising a pair of ear-worn electronic devices, each of which includes a directional magnetic antenna for establishing a magnetic communications link in accordance with various embodiments.

FIG. 2 illustrates an ear-worn electronic system comprising a pair of ear-worn electronic devices, each of which includes a directional magnetic antenna for establishing a magnetic communications link in accordance with various embodiments. The ear-worn electronic system 200 shown in FIG. 2 includes a left ear-worn electronic device 210 positioned at the left side 204 of a wearer's head 202 and a right ear-worn electronic device 240 positioned at the right side 206 of the wearer's head 202. The left ear-worn electronic device 210 includes a housing 211 having a first end 212 and an opposing second end 214. The housing 211 also includes a first side 216 and an opposing second side 218. The first side 216 of the housing 211 is configured to contact the left side 204 of the wearer's head 202. A battery 224 is disposed within the housing 211 proximate the first end 212. An acoustic receiver or an acoustic receiver connector 220 is disposed within the housing 211 proximate the second end 214. Various electronics 222, including an NFMI radio, are disposed between the battery 224 and the receiver/connector 220. The electronics 222 can include, for example, one or more processors, microphones, micro switches, memory, power management circuitry, and a long-range radio (e.g., a Bluetooth® radio).

A directional magnetic antenna 226 is situated proximate the first end 212 of the housing 211. Situating the directional magnetic antenna 226 near the first end 212 serves to spatially separate the antenna 226 from internal magnetic noise sources within the housing 211. According to various embodiments, the directional magnetic antenna 226 includes a core having a complex shape, allowing the directional magnetic antenna 226 to preferentially interact with the magnetic field in one direction versus another (see, e.g., FIGS. 3 and 4). In some embodiments, a magnetic shield 228 is situated proximate the directional magnetic antenna 226 within the housing 211. The magnetic shield 228 can be supported by or embedded within the second side 218 of the housing 211. The magnetic shield 228 can be a stamped or a printed structure (e.g., a laser direct structuring (LDS) structure) comprising high permeability material. The high permeability material can comprise ferrite, ferrite loaded elastomer, a ferromagnetic material (e.g., steel), or mu-metal, for example. The magnetic shield 228 is configured as a low reluctance path to an external source of magnetic noise impinging on the second side 218 of the housing 211. The shape of the magnetic shield 228 serves to redirect the external magnetic noise away from the coil aperture of the directional magnetic antenna 226.

The right ear-worn electronic device 240 shown in FIG. 2 includes a housing 241 having a first end 242 and an opposing second end 244. The housing 241 also includes a first side 246 and an opposing second side 248. The first side 246 of the housing 241 is configured to contact the right side 206 of the wearer's head 202. A battery 254 is disposed within the housing 241 proximate the first end 242. An acoustic receiver or an acoustic receiver connector 250 is disposed within the housing 241 proximate the second end 244. Various electronics 252, including an NFMI radio, are disposed between the battery 254 and the receiver/connector 250. The electronics 252 can include those housed in the left ear-worn electronic device 210.

A directional magnetic antenna 256 is situated proximate the first end 242 of the housing 241, which serves to spatially separate the antenna 256 from internal magnetic noise sources within the housing 241. According to various embodiments, the directional magnetic antenna 256 includes a core having a complex shape, allowing the antenna 256 to preferentially interact with the magnetic field in one direction versus another. In some embodiments, a magnetic shield 258 is situated proximate the directional magnetic antenna 256 within the housing 241. The magnetic shield 258 can be supported by or embedded within the second side 248 of the housing 241, and comprise the same structure and material as the magnetic shield 228 of the left ear-worn electronic device 210. The magnetic shield 258 is configured as a low reluctance path to an external source of magnetic noise impinging on the second side 248 of the housing 241. The shape of the magnetic shield 258 serves to redirect the external magnetic noise away from the coil aperture of the directional magnetic antenna 256. The directional magnetic antennas 226 and 256 are configured to support a magnetic (e.g., NFMI) communications link for effecting communication between the left and right ear-worn devices 210, 240.

Figure 3:
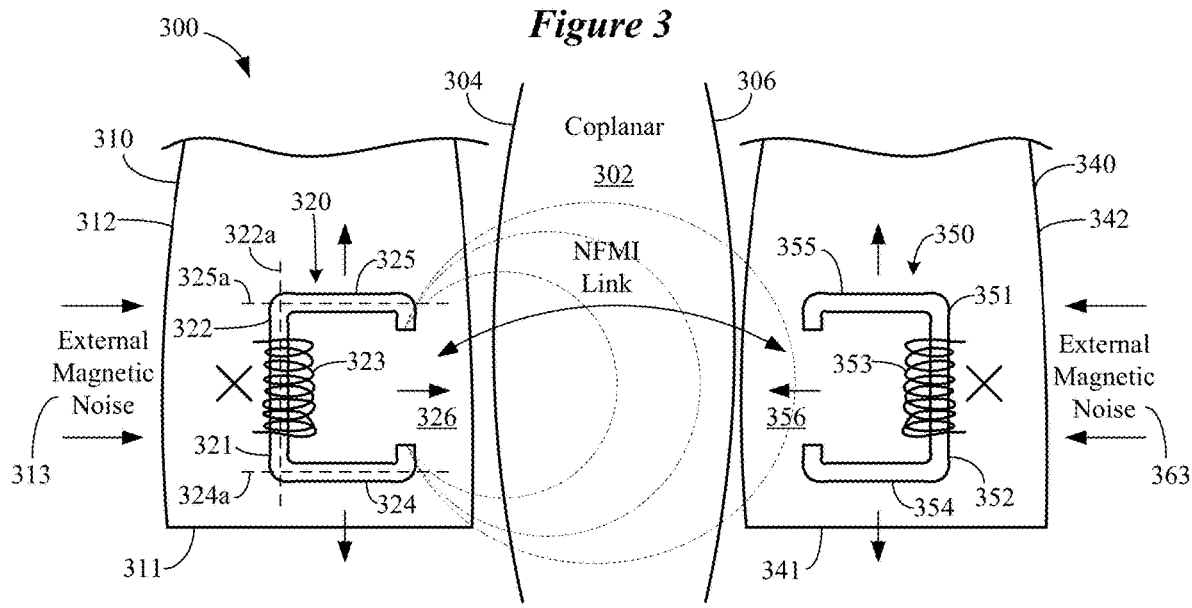
FIG. 3 illustrates an ear-worn electronic system comprising a pair of ear-worn electronic devices, each of which includes a directional magnetic antenna for establishing a magnetic communications link in accordance with various embodiments.

FIG. 3 illustrates an ear-worn electronic system comprising a pair of ear-worn electronic devices, each of which includes a directional magnetic antenna for establishing a magnetic communications link in accordance with various embodiments. The ear-worn electronic system 300 shown in FIG. 3 includes a left ear-worn electronic device 310 positioned at the left side 304 of a wearer's head 302 and a right ear-worn electronic device 340 positioned at the right side 306 of the wearer's head 302. FIG. 3 illustrates a coplanar NFMI coil coupling mode which reduces the impact of external magnetic field noise on the magnetic communications link budget.

The left ear-worn electronic device 310 includes a directional magnetic antenna 320 comprising a core 321 and a coil 323 wound around a portion of the core 321. The core 321 comprises high permeability material and has a complex shape. In the embodiment shown in FIG. 3, the core 321 has a C-shape. A core having a complex shape refers to a core with a longitudinal axis comprising a first portion and at least a second portion that is non-parallel with respect to the first portion (e.g., a curved longitudinal axis). For example, a core having a complex shape refers to a core comprising at least a first portion having a first longitudinal axis and a second portion having a second longitudinal axis, such that the first longitudinal axis is non-parallel with respect to the second longitudinal axis. A core having a complex shape can have a closed end, which is oriented toward the source of magnetic noise, and an open end, which is oriented away from the source of magnetic noise. The core is oriented to reduce induced voltages from noisy magnetic fields while not attenuating induced voltages from desired (e.g., signal) magnetic fields. Other representative cores having a complex shape include those having a U-shape, a semi/partially-rectangular-U shape, an L-shape, or a horseshoe-like shape. In contrast to the complex shape of core 321 shown in FIG. 3 and as described herein, a conventional core has a simple shape with a straight longitudinal axis (e.g., a straight cylindrical rod).

The C-shaped core 321 includes a first portion 322 having a first longitudinal axis 322a, a second portion 324 having a second longitudinal axis 324a, and third portion 325 having third longitudinal axis 325a. The first longitudinal axis 322a is non-parallel (e.g., oblique, perpendicular) with respect to the second and third longitudinal axes 324a, 325a. The complex shape of the core 321 provides for increased strength of the magnetic field lines between the ends of the outwardly extending second and third portions 324, 325 and decreased strength of the magnetic field lines emanating from the closed portion 322 of the C-shaped core 321. The closed portion 322 defines a low reluctance portion of the core 321. In the embodiment shown in FIG. 3, the low reluctance portion 322 of the core 321 is oriented towards a known source of external magnetic noise 313 (e.g., a display of a smartphone) that impinges on the side 312 of the housing 311. In this orientation, the directional magnetic antenna 320 has a lower response to external magnetic noise 313 relative to desired (e.g., signal) magnetic fields. In FIG. 3, the symbol X indicates a direction of a weaker magnetic field, while the arrows indicate a direction of a higher-strength magnetic field.

The right ear-worn electronic device 340 includes a directional magnetic antenna 350 comprising a core 351 and a coil 353 wound around a portion of the core 351. The core 351 has a complex shape, which is a C-shape in this embodiment. A closed portion 352 defines a low reluctance portion of the core 351. The low reluctance portion 352 of the core 351 is oriented towards a known external magnetic noise source 363 (e.g., a display of a smartphone). In this orientation, the directional magnetic antenna 350 has a lower response to external magnetic noise 363 relative to desired (e.g., signal) magnetic fields. The coplanar NFMI coil coupling mode illustrated in FIG. 3 provides for ear-to-ear magnetic field communications while rejecting magnetic field noise external to the human head, and thus provides a net improvement to the magnetic communications link budget.

Figure 4:
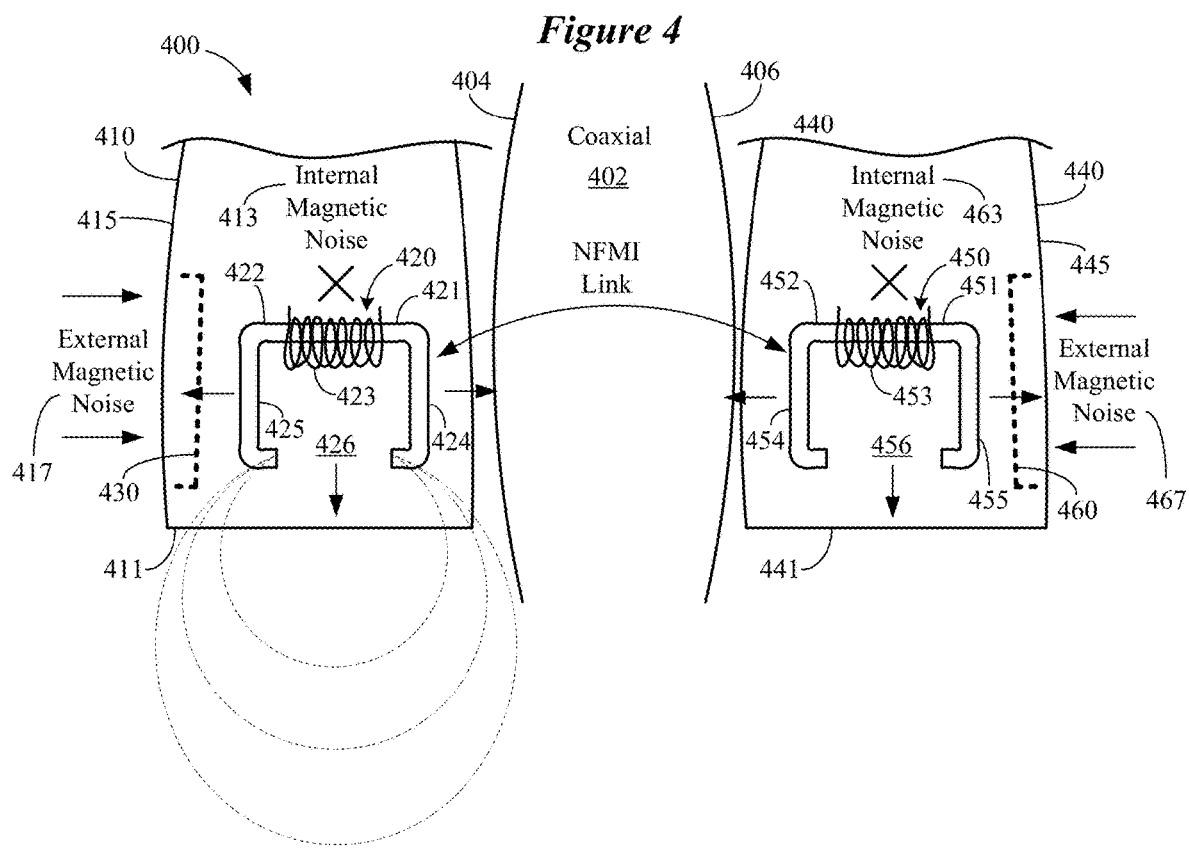
FIG. 4 illustrates an ear-worn electronic system comprising a pair of ear-worn electronic devices, each of which includes a directional magnetic antenna for establishing a magnetic communications link and a magnetic shield for redirecting external magnetic noise away from the antenna in accordance with various embodiments.

FIG. 4 illustrates an ear-worn electronic system comprising a pair of ear-worn electronic devices, each of which includes a directional magnetic antenna for establishing a magnetic communications link in accordance with various embodiments. The ear-worn electronic system 400 shown in FIG. 4 includes a left ear-worn electronic device 410 positioned at the left side 404 of a wearer's head 402 and a right ear-worn electronic device 440 positioned at the right side 406 of the wearer's head 402. FIG. 4 illustrates a coaxial NFMI coil coupling mode which reduces the impact of internal magnetic field noise on the magnetic communications link budget.

The left ear-worn electronic device 410 includes a directional magnetic antenna 420 comprising a core 421 and a coil 423 wound around a portion of the core 421. The core 421 comprises high permeability material and has a complex shape. In the embodiment shown in FIG. 4, the core 421 has a C-shape. A closed portion 422 defines a low reluctance portion of the core 421. The low reluctance portion 422 of the core 421 is oriented towards a known internal magnetic noise source 413 (e.g., certain electronics in the device 410). In this orientation, the directional magnetic antenna 420 has a lower response to internal magnetic noise 413 relative to desired (e.g., signal) magnetic fields.

The left ear-worn electronic device 410 also includes a magnetic shield 430 situated proximate the directional magnetic antenna 420. The magnetic shield 430 can be supported by or embedded within the second side 415 of the housing 411, and comprise the same structure and material as the magnetic shield 228 of FIG. 2. The magnetic shield 430 is configured as a low reluctance path to external magnetic noise 417 impinging on the second side 415 of the housing 411. The shape of the magnetic shield 430 serves to redirect the external magnetic noise 417 away from the coil aperture 426 of the directional magnetic antenna 420.

The right ear-worn electronic device 440 includes a directional magnetic antenna 450 comprising a core 451 and a coil 453 wound around a portion of the core 451. The core 451 comprises high permeability material and has a complex shape (e.g., a C-shape). A closed portion 452 defines a low reluctance portion of the core 451, which is oriented towards a known internal magnetic noise source 463 (e.g., certain electronics in the device 440). In this orientation, the directional magnetic antenna 450 has a lower response to internal magnetic noise 463 relative to desired (e.g., signal) magnetic fields.

The right ear-worn electronic device 440 also includes a magnetic shield 460 situated proximate the directional magnetic antenna 450. The magnetic shield 460 can be supported by or embedded within the second side 445 of the housing 441, and comprise the same structure and material as the magnetic shield 228 of FIG. 2. The magnetic shield 460 is configured as a low reluctance path to external magnetic noise 467 impinging on the second side 445 of the housing 441. The shape of the magnetic shield 460 serves to redirect the external magnetic noise 467 away from the coil aperture 456 of the directional magnetic antenna 450. It is noted that a magnetic shield can be incorporated in the left and right ear-worn electronic devices 310, 340 of FIG. 3 to enhance the redirection of external magnetic noise away from the coil apertures 326, 356. The coaxial NFMI coil coupling mode and magnetic shielding structure illustrated in FIG. 4 provides for ear-to-ear magnetic field communications while rejecting magnetic field noise internal to the ear-worn electronic device and external to the human head, and thus provides a net improvement to the magnetic communications link budget.

Figure 5A:
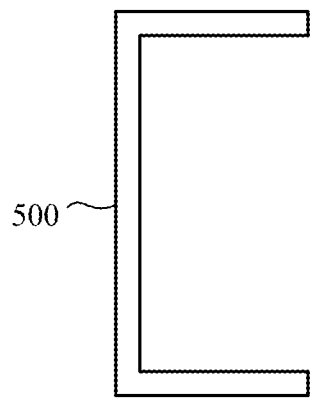
FIGS. 5A-5D illustrate cores of a directional magnetic antenna having a variety of complex shapes in accordance with various embodiments.
Figure 5B:
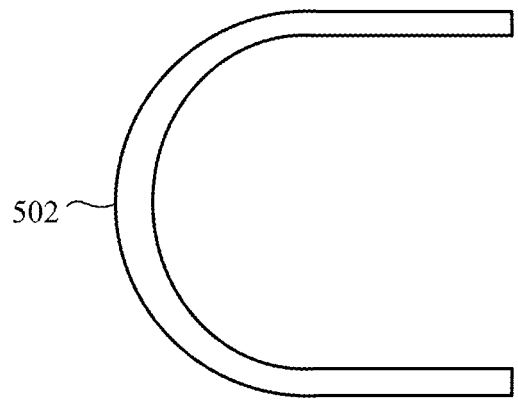
Figure 5C:
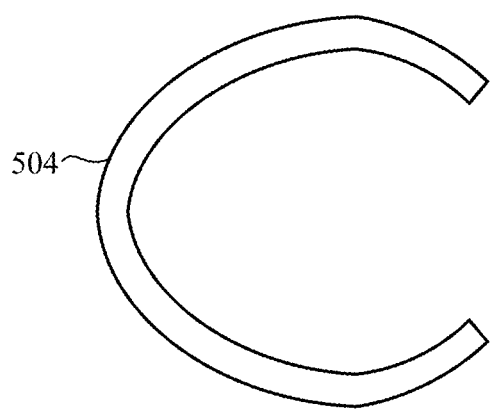
Figure 5D:
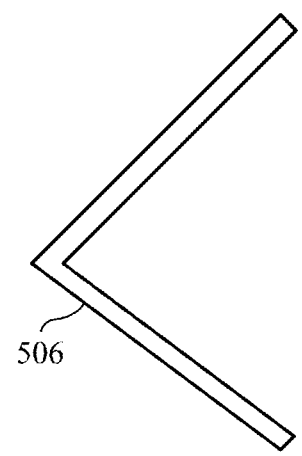

The core of a directional magnetic antenna of the present disclosure can have a variety of complex shapes. In some embodiments, the core 500 can have a C-shape, as is shown in the embodiment of FIG. 5A. In other embodiments, the core 502 can have a U-shape, as is shown in the embodiment of FIG. 5B. In further embodiments, the core 504 can have a horseshoe shape, as is shown in the embodiment of FIG. 5C. In some embodiments, the core 506 can have an L-shape, as is shown in the embodiment of FIG. 5D. It is understood that the core of a directional magnetic antenna of the present disclosure can have a complex shape differing from those disclosed herein.

According to various embodiments, the core of a directional magnetic antenna can comprise existing high permeability components in the ear-worn electronic device. In the embodiment shown in FIG. 6, an ear-worn electronic device 600 includes an acoustic receiver 602, electronics 604, and a battery 606. The receiver 602 has a housing comprising ferrous material or other suitable high permeability material (e.g., mu-metal). The directional magnetic antenna 610 has a core 611 comprising a ferrite rod 612, a strap 616 comprising high permeability material, and the housing of the receiver 602. A coil 614 is wound around the ferrite rod 612. It can be seen in FIG. 6 that the ferrite rod 612, strap 616, and receiver 602 form a C-shaped core 611. The strap 616 can comprise a ferrite loaded elastomer, a ferromagnetic material (e.g., steel), or mu-metal, for example. The strap 616 defines a low reluctance portion of the core 611 which can be oriented in a direction of a known external magnetic noise source.

FIG. 7 shows another embodiment of a directional magnetic antenna having a core comprising existing high permeability components in the ear-worn electronic device. In the embodiment shown in FIG. 7, an ear-worn electronic device 700 includes an acoustic receiver 702, shielded electronics 704, unshielded electronics 706, and a battery 708. The shielded electronics 704 are enclosed in a housing comprising magnetic shielding material, such as mu-metal. The directional magnetic antenna 710 has a core 711 comprising a ferrite rod 712, a strap 716, and the housing of the shielded electronics 704. A coil 714 is wound around the ferrite rod 712. It can be seen in FIG. 7 that the ferrite rod 712, strap 716, and the housing of the shielded electronics 704 form a C-shaped core 711. The strap 716 can comprise a ferrite loaded elastomer, a ferromagnetic material (e.g., steel), or mu-metal, for example. The strap 716 defines a low reluctance portion of the core which can be oriented in a direction of a known external magnetic noise source.

FIG. 8 shows a directional magnetic antenna having a core with a complex shape in accordance with various embodiments. The directional magnetic antenna 800 shown in FIG. 8 includes a ferrite rod 802 and a coil 804 wound around the rod 802. The directional magnetic antenna 800 also includes a first strip 806 and a second strip 808 respectively extending from opposing ends of the ferrite rod 802. The first and second strips 806, 808 comprise a ferromagnetic material (e.g., steel) or other suitable high permeability material. The ferrite rod 802, first strip 806, and second strip 808 are configured to partially encompass a battery 810 of the ear-worn electronic device. The first and second strips 806, 808 run alongside and slightly beyond the battery 810 in the configuration shown in FIG. 8. The ferrite rod 802, first strip 806, and second strip 808 define a C-shaped or horseshoe-shaped core 801.

According to some embodiments, the first and second strips 806, 808 can be plated with an electrically conductive material (e.g., silver, gold, copper) and include battery contacts 807, 809 configured to electrically connect with cathode and anode contacts of the battery 810. The battery 810, made of weekly ferrous material, creates a significantly different magnetic path, but may have a significant amount of effective magnetic aperture.

Figure 9:
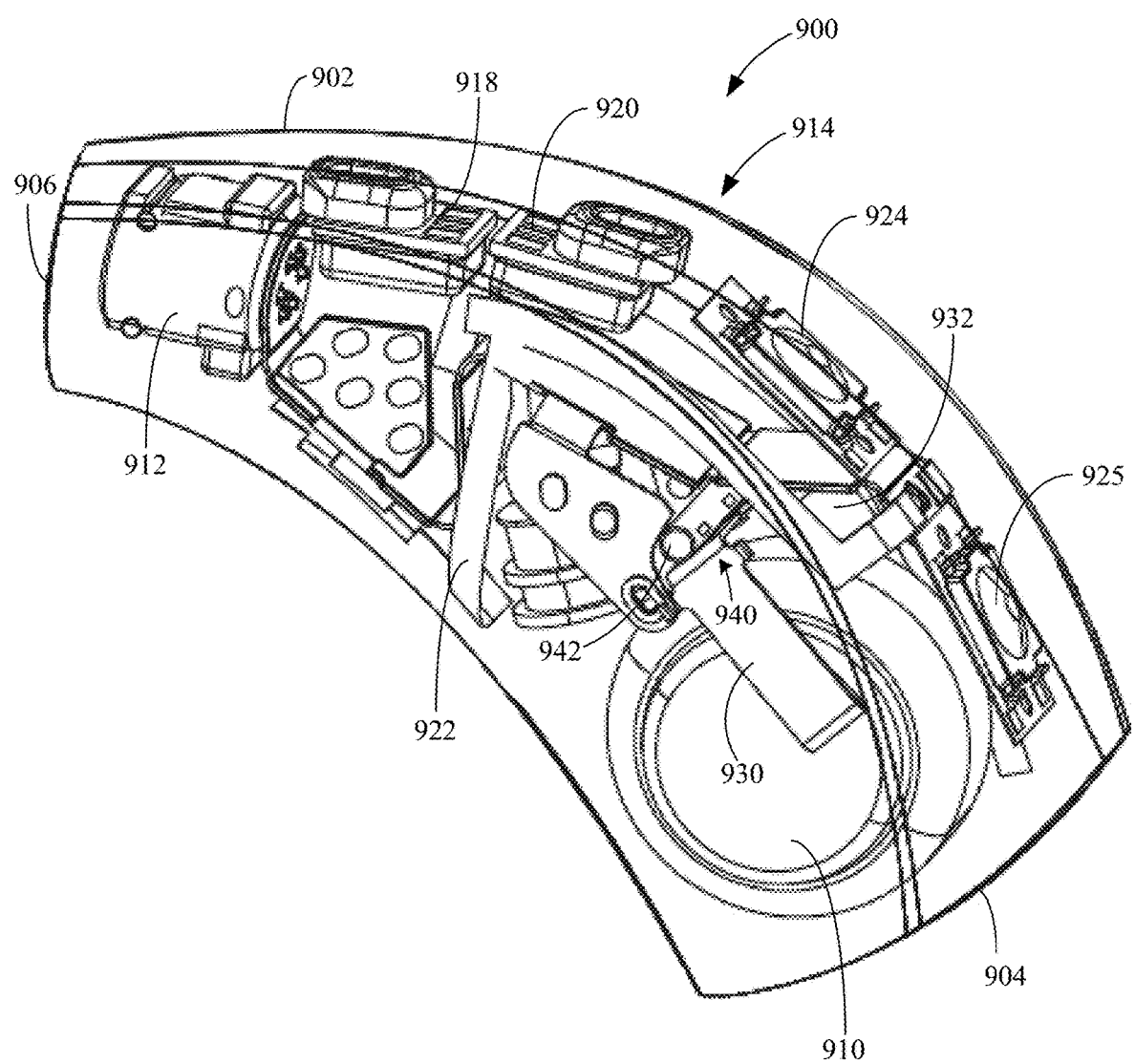
FIG. 9 illustrates an ear-worn electronic device comprising a directional magnetic antenna in accordance with various embodiments.

FIG. 9 illustrates an ear-worn electronic device comprising a directional magnetic antenna in accordance with various embodiments. The ear-worn electronic device 900 shown in FIG. 9 is configured as a RIC device. The ear-worn electronic device 900 includes a housing 902 having a first end 904 and an opposing second end 906. A battery 910 is disposed within the housing 902 proximate the first end 904. An acoustic receiver connector 912 is disposed within the housing 902 proximate the second end 906. The receiver connector 912 is adapted to establish electrical connection with an acoustic receiver configured for placement within the wearer's ear canal. An electronic circuit board 916 is disposed within the housing 902 and supports or is coupled to various electronics 914, including microphones 918, 920, a micro-switches 924, 925, RF (e.g., 2.4 GHz) antenna 922 and radio, DSP, and NFMI radio, among other components.

A directional magnetic antenna 940 is situated proximate the first end 904 of the housing 902 and connected between contacts 930, 932 of the battery 910, such as in the manner described previously with regard to the embodiment shown in FIG. 8. The directional magnetic antenna 940 comprises a ferrite rod 942 and a coil wound around the rod 942. The directional antenna 940 comprises a core comprising the ferrite rod 942 and the first and second contacts 930, 932. In this embodiment, the core of the directional magnetic antenna 940 can have a C-shape, U-shape, or horseshoe shape.

Figure 10:
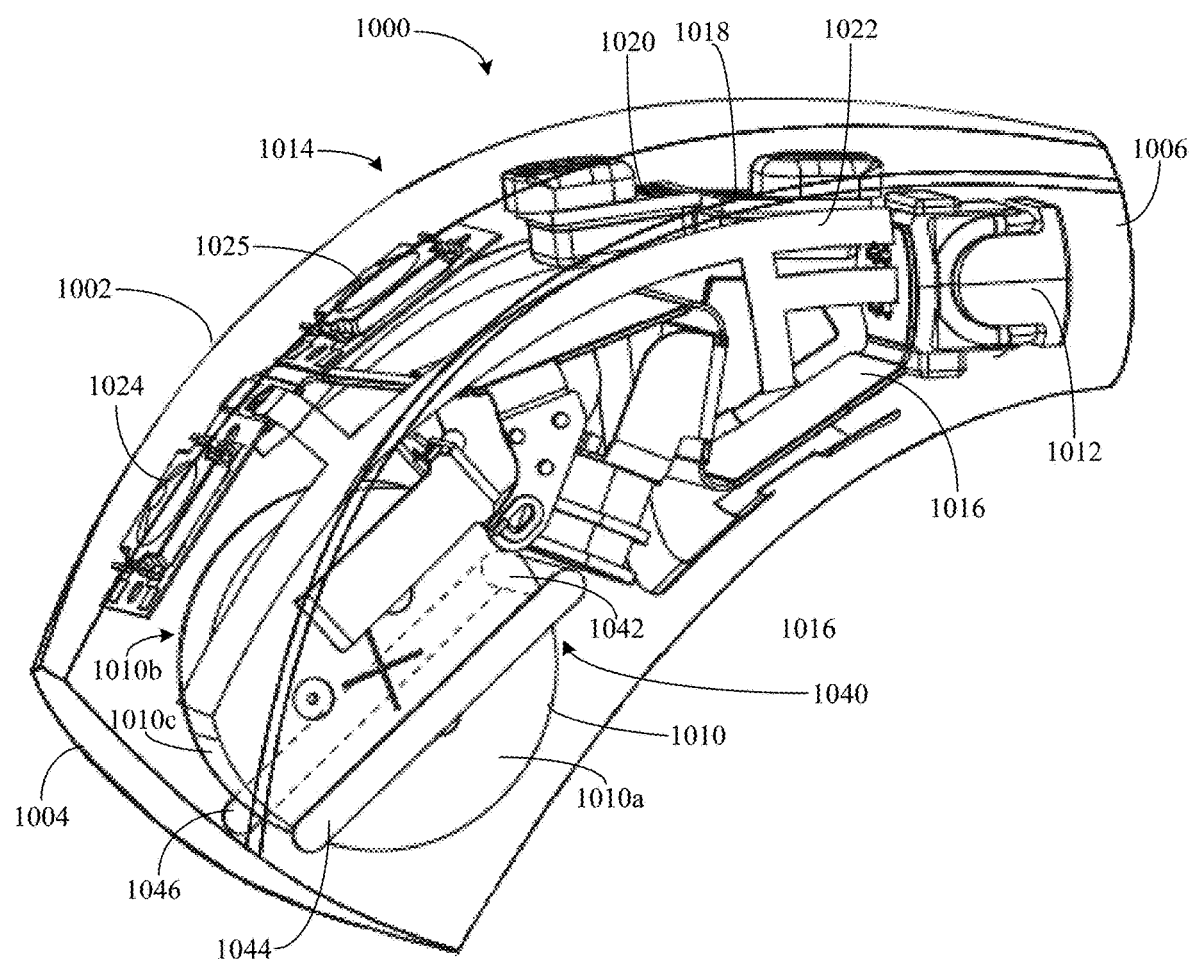
FIG. 10 illustrates an ear-worn electronic device comprising a directional magnetic antenna in accordance with various embodiments.

FIG. 10 illustrates an ear-worn electronic device comprising a directional magnetic antenna in accordance with various embodiments. The ear-worn electronic device 1000 shown in FIG. 10 is configured as a RIC device. The ear-worn electronic device 1000 includes a housing 1002 having a first end 1004 and an opposing second end 1006. A battery 1010 is disposed within the housing 1002 proximate the first end 1004. An acoustic receiver connector 1012 is disposed within the housing 1002 proximate the second end 1006. The receiver connector 1012 is adapted to establish electrical connection with an acoustic receiver configured for placement within the wearer's ear canal. An electronic circuit board 1016 is disposed within the housing 1002 and supports or is coupled to various electronics 1014, including microphones 1018, 1020, micro-switches 1024, 1025, RF (e.g., 2.4 GHz) antenna 1022 and radio, DSP, and NFMI radio, among other components. A directional magnetic antenna 1040 is situated proximate the battery 1010 and partially encompasses the battery 1010.

The directional magnetic antenna 1040 comprises a ferrite rod 1042 with a coil wound around the rod 1042. As shown, the ferrite rod 1042 is situated between the battery 1010 and the electronics 1014. The battery 1010 includes a first surface 1010a, an opposing second surface 1010b, and a peripheral surface 1010c between and connecting with the first and second surfaces 1010a, 1010b. The ferrite rod 1042 is situated along the peripheral surface 1010c of the battery 1010. A first strap 1044 comprising high permeability material extends from one end of the ferrite rod 1042 along the first surface 1010a of the battery 1010, preferably extending beyond the peripheral surface 1010c of the battery 1010. A second strap 1046 comprising high permeability material extends from a second end of the ferrite rod 1042 along the second surface 1010b of the battery 1010, preferably extending beyond the peripheral surface 1010c of the battery 1010 (see, e.g., the embodiment illustrated in FIG. 8). The straps 1044, 1046 can comprise a ferrite loaded elastomer, a ferromagnetic material (e.g., steel), or mu-metal, for example. The directional antenna 1040 comprises a core comprising the ferrite rod 1042 and the first and second straps 1044, 1046. In this embodiment, the core of the directional magnetic antenna 1040 can have a C-shape, U-shape, or horseshoe shape.

FIGS. 11A and 11B illustrate an ear-worn electronic device comprising a directional magnetic antenna in accordance with various embodiments. The ear-worn electronic device 1100 shown in FIGS. 11A and 11B is configured as a BTE device. The ear-worn electronic device 1100 includes a housing 1102 having a first end 1104 and an opposing second end 1106. The housing 1102 also includes a first side 1103 configured to contact the wearer's head and an opposing second side 1105. A battery 1110 is disposed within the housing 1102 proximate the first end 1104. An acoustic receiver 1112 is disposed within the housing 1102 proximate the second end 1106. The receiver 1112 includes a housing comprising high permeability material (e.g., mu-metal). An electronic circuit board 1116 is disposed within the housing 1102 and supports or is coupled to various electronics 1114, including microphones 1118, 1120, a micro-switch 1124, RF (e.g., 2.4 GHz) antenna 1122 and radio, DSP, and NFMI radio, among other components.

A directional magnetic antenna 1140 includes a ferrite rod 1142 with a coil wound around the rod 1142. The ferrite rod 1142 is situated proximate the battery 1110. As shown, the ferrite rod 1142 is situated between the battery 1110 and the first end 1104 of the housing 1102. A strap 1144 comprising high permeability material extends from the ferrite rod 1142, along the second side 1105 of the housing 1102, and contacts the receiver 1112. The strap 1144 can comprise a ferrite loaded elastomer, a ferromagnetic material (e.g., steel), or mu-metal, for example. The strap 1144 defines a low reluctance portion of the directional magnetic antenna 1140 which is oriented toward an external source of magnetic noise impinging on the second side 1105 of the housing 1102. In this orientation, the directional magnetic antenna 1140 has a lower response to external magnetic noise relative to desired (e.g., signal) magnetic fields. The directional magnetic antenna 1140 has a core comprising the ferrite rod 1142, the strap 1144, and the receiver 1112, similar to that shown in the embodiment illustrated in FIG. 6. In this embodiment, the core of the directional magnetic antenna 1140 can have a C-shape, U-shape, or horseshoe shape.

Figure 12B:
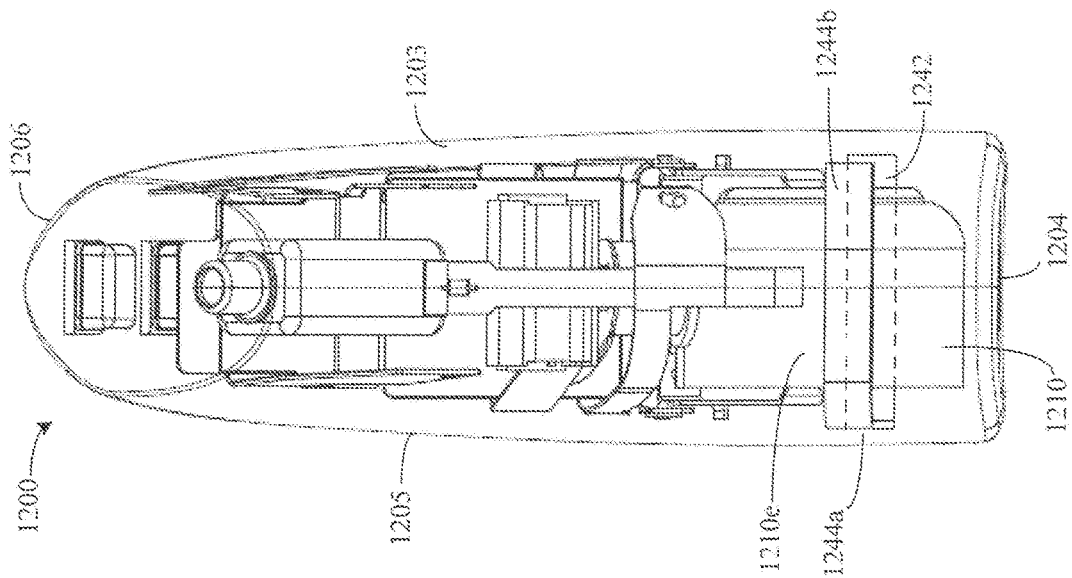
FIGS. 12A and 12B illustrate an ear-worn electronic device comprising a directional magnetic antenna in accordance with various embodiments.
Figure 12A:
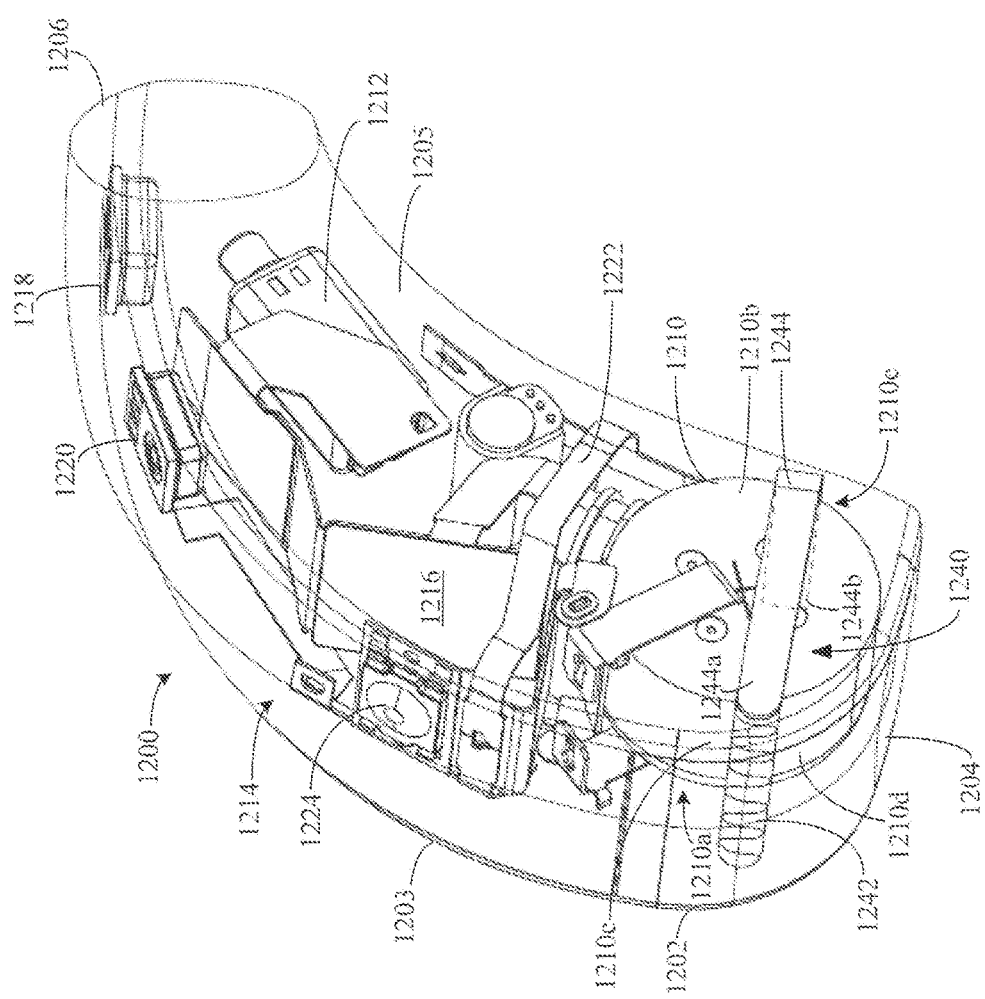

FIGS. 12A and 12B illustrate an ear-worn electronic device comprising a directional magnetic antenna in accordance with various embodiments. The ear-worn electronic device 1200 shown in FIGS. 12A and 12B is configured as a BTE device. The ear-worn electronic device 1200 includes a housing 1202 having a first end 1204 and an opposing second end 1206. The housing 1202 also includes a first side 1203 configured to contact the wearer's head and an opposing second side 1205. A battery 1210 is disposed within the housing 1202 proximate the first end 1204. The battery 1210 includes a first surface 1210a facing the first side 1203 of the housing 1202 and an opposing second surface 1210b facing the second side 1205 of the housing 1202. The battery 120 includes a peripheral surface 1210c between and contacting with the first and second surfaces 1210a, 1210b. An acoustic receiver 1212 is disposed within the housing 1202 proximate the second end 1206. An electronic circuit board 1216 is disposed within the housing 1202 and supports or is coupled to various electronics 1214, including microphones 1218, 1220, a micro-switch 1224, RF (e.g., 2.4 GHz) antenna 1222 and radio, DSP, and NFMI radio, among other components.

A directional magnetic antenna 1240 includes a ferrite rod 1242 with a coil wound around the rod 1242. The directional magnetic antenna 1240 also includes a strap 1244 comprising high permeability material connected to the ferrite rod 1242. The ferrite rod 1242 is situated proximate a first section 1210d of a peripheral surface 1210c of the battery 1210. A first portion 1244a of the strap 1244 extends from the ferrite rod 1242 along the second surface 1210b of the battery 1210. A second portion 1244b (shown in dashed lines) of the strap 1244 extends along a second section 1210e of the peripheral surface 1210c of the battery 1210. The strap 1244 can comprise a ferrite loaded elastomer, a ferromagnetic material (e.g., steel), or mu-metal, for example. The first portion 1244a of the strap 1244 defines a low reluctance portion of the directional magnetic antenna 1240 which is oriented towards an external source of magnetic noise impinging on the second side 1205 of the housing 1202. In this orientation, the directional magnetic antenna 1240 has a lower response to external magnetic noise relative to desired (e.g., signal) magnetic fields. The directional magnetic antenna 1240 has a core comprising the ferrite rod 1242 and the strap 1244, and can have a C-shape, U-shape, or horseshoe shape.

FIGS. 13A and 13B illustrate an ear-worn electronic device comprising a magnetic antenna and a magnetic shield in accordance with various embodiments. The ear-worn electronic device 1300 shown in FIGS. 13A and 13B is configured as a BTE device. The ear-worn electronic device 1300 includes a housing 1302 having a first end 1304 and an opposing second end 1306. The housing 1302 also includes a first side 1303 configured to contact the wearer's head and an opposing second side 1305. A battery 1310 is disposed within the housing 1302 proximate the first end 1304. An acoustic receiver 1312 is disposed within the housing 1302 proximate the second end 1306. An electronic circuit board 1316 is disposed within the housing 1302 and supports or is coupled to various electronics 1314, including microphones 1318, 1320, a micro-switch 1324, RF (e.g., 2.4 GHz) antenna 1322 and radio, DSP, and NFMI radio, among other components.

A magnetic antenna 1340 includes a ferrite rod 1342 with a coil wound around the rod 1342. The ferrite rod 1342 is situated proximate the battery 1210 and the first end 1304 of the housing 1302. In this embodiment, the magnetic antenna 1340 need not be a directional magnetic antenna. A magnetic shield 1350 is situated proximate the magnetic antenna 1340. The magnetic shield 1350 can be supported by or embedded within the second side 1305 and, in some configurations, the top 1307 of the housing 1302. The magnetic shield 1350 can be a stamped or a printed structure (e.g., a laser direct structuring (LDS) structure) comprising high permeability material. The high permeability material can comprise ferrite, ferrite loaded elastomer, a ferromagnetic material (e.g., steel), or mu-metal, for example. The magnetic shield 1350 is configured as a low reluctance path to an external source of magnetic noise impinging on the second side 1305 of the housing 1302. The shape of the magnetic shield 1350 serves to redirect the external magnetic noise away from the coil aperture of the magnetic antenna 1340.

Figure 14A:
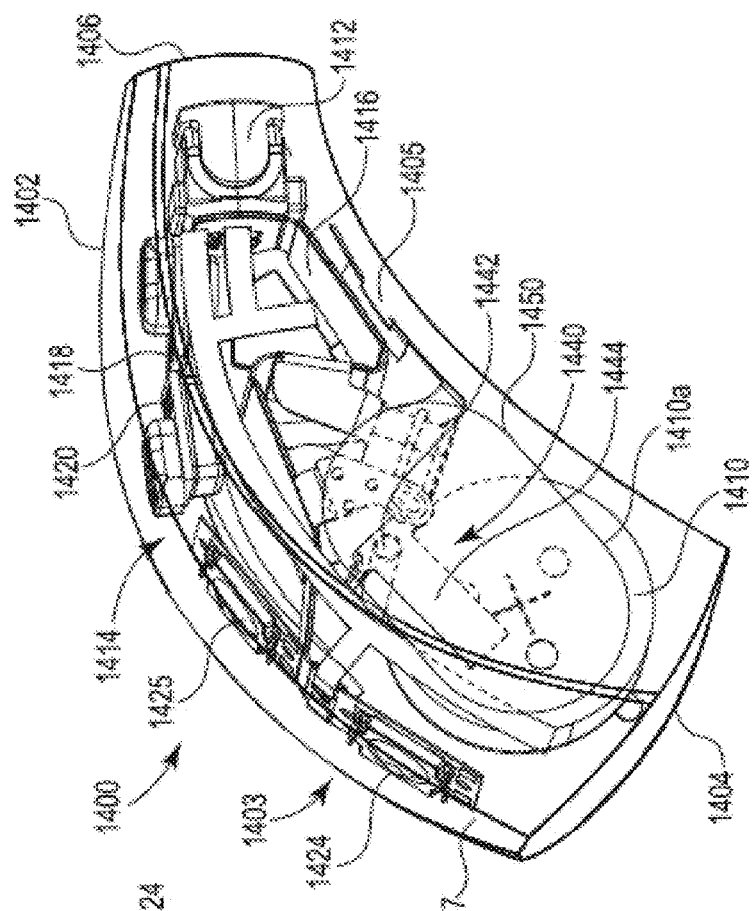
FIGS. 14A and 14B illustrate an ear-worn electronic device comprising a directional magnetic antenna and a magnetic shield in accordance with various embodiments.
Figure 14B:
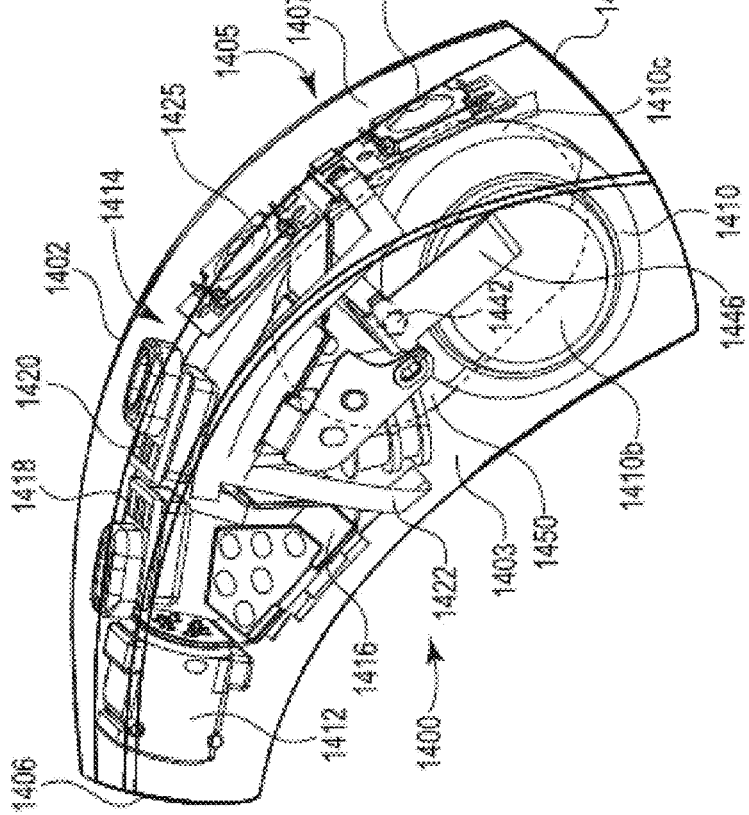

FIGS. 14A and 14B illustrate an ear-worn electronic device comprising a directional magnetic antenna and a magnetic shield in accordance with various embodiments. The ear-worn electronic device 1400 shown in FIGS. 14A and 14B is configured as an RIC device. The ear-worn electronic device 1400 includes a housing 1402 having a first end 1404 and an opposing second end 1406. The housing 1402 also includes a first side 1403 configured to contact the wearer's head and an opposing second side 1405. A battery 1410 is disposed within the housing 1402 proximate the first end 1404. An acoustic receiver connector 1412 is disposed within the housing 1402 proximate the second end 1406. The receiver connector 1412 is adapted to establish electrical connection with a receiver configured for placement within the wearer's ear canal. An electronic circuit board 1416 is disposed within the housing 1402 and supports or is coupled to various electronics 1414, including microphones 1418, 1420, micro-switches 1424, 1425, RF (e.g., 2.4 GHz) antenna 1422 and radio, DSP, and NFMI radio, among other components.

A directional magnetic antenna 1440 comprises a ferrite rod 1442 with a coil wound around the rod 1442. The ferrite rod 1442 is situated along a peripheral surface 1410c of the battery 1410. As shown, the ferrite rod 1442 is situated between the battery 1410 and the electronics 1414. As best seen in FIG. 14B, a first strap 1444 comprising high permeability material extends from one end of the ferrite rod 1040 along a first surface 1410a of the battery 1410. As best seen in FIG. 14A, a second strap 1446 comprising high permeability material extends from a second end of the ferrite rod 1442 along a second surface 1410b of the battery

1410. The straps 1444, 1446 can comprise a ferrite loaded elastomer, a ferromagnetic material (e.g., steel), or mu-metal, for example. The directional antenna 1440 has a core comprising the ferrite rod 1042 and the first and second straps 1044, 1046. In some embodiments, the first and second straps 1044, 1046 can constitute first and second battery contacts, as in the embodiment illustrated in FIG. 8. In other embodiments, the first and second straps 1044, 1046 are not configured as first and second battery contacts. In this embodiment, the core of the directional magnetic antenna 1440 can have a C-shape, U-shape, or horseshoe shape.

A magnetic shield 1450 is situated proximate the directional antenna 1440. The magnetic shield 1450 can be supported by or embedded within the second side 1405 and, in some configurations, the top 1407 of the housing 1402. The magnetic shield 1450 can be a stamped or a printed structure (e.g., a laser direct structuring (LDS) structure) comprising high permeability material. The high permeability material can comprise ferrite, ferrite loaded elastomer, a ferromagnetic material (e.g., steel), or mu-metal, for example. The magnetic shield 1450 is configured as a low reluctance path to an external source of magnetic noise impinging on the second side 1405 of the housing 1402. The shape of the magnetic shield 1450 serves to redirect the external magnetic noise away from the coil aperture of the directional magnetic antenna 1440.

This document discloses numerous embodiments, including but not limited to the following:

Item 1 is an ear-worn electronic device configured to be worn by a wearer, comprising:
 a housing comprising a first end and an opposing second end, a first side and an opposing second side, and the first and second sides extending between the first and second ends, the first side configured to contact the wearer's head;
 a battery disposed within the housing proximate the first end;
 an acoustic receiver or an acoustic receiver connector disposed within the housing proximate the second end;
 electronics including a near-field magnetic induction (NFMI) radio disposed in the housing; and
 a directional magnetic antenna situated in or on the housing and coupled to the NFMI radio, the antenna comprising a core having a complex shape and a coil wound around a portion of the core, the core comprising a closed end oriented toward a source of magnetic noise and an open end oriented away from the source of magnetic noise.

Item 2 is the device of item 1, wherein the antenna is oriented within the housing to reduce induced voltages from noisy magnetic fields while not attenuating induced voltages from desired magnetic fields.

Item 3 is the device of item 1, wherein:
 the closed end of the core is oriented towards the second side of the housing; and
 the open end of the core is oriented towards the first side of the housing.

Item 4 is the device of item 1, wherein:
 the closed end of the core is oriented towards the electronics; and
 the open end of the core is oriented towards the first end of the housing.

Item 5 is the device of item 1, wherein the coil-wound portion of the core is situated between the battery and the first end of the housing.

Item 6 is the device of item 1, wherein the coil-wound portion of the core is situated between the electronics and the first end of the housing.

Item 7 is the device of item 1, wherein the core comprises a longitudinal axis comprising a first portion and at least a second portion that is non-parallel with respect to the first portion.

Item 8 is the device of item 1, wherein the core comprises a curved longitudinal axis.

Item 9 is the device of item 1, wherein the core has a C-shape, a U-shape, a horseshoe shape or an L-shape.

Item 10 is the device of item 1, wherein:
 the battery comprises a first surface facing the first side of the housing, a second surface facing the second side of the housing, and a peripheral surface between and connecting with the first and second surfaces; and
 the core comprises:
  a first portion extending from the coil-wound portion along the first surface of the battery; and
  a second portion extending from the coil-wound portion along the second surface of the battery.

Item 11 is the device of item 10, wherein:
 the coil-wound portion comprises a ferrite rod; and
 each of first and second portions of the core comprises a ferrite-loaded elastomer, ferromagnetic material or mu-metal.

Item 12 is the device of item 10, wherein:
 the first portion of the core comprises a first electrical contact configured to electrically connect with the first surface of the battery; and
 the second portion of the core comprises a second electrical contact configured to electrically connect with the second surface of the battery.

Item 13 is the device of item 1, wherein:
 at least some of the electronics or the acoustic receiver is disposed in an enclosure comprising high permeability material;
  the coil-wound portion is situated adjacent the battery; and
  the core comprises a strap comprising high permeability material extending from the coil-wound portion, along the second side of the housing, and connecting to the enclosure.

Item 14 is the device of item 1, wherein:
 the battery comprises a first surface facing the first side of the housing, a second surface facing the second side of the housing, and a peripheral surface between and connecting with the first and second surfaces;
 the coil-wound portion is situated adjacent a first section of the peripheral surface of the battery; and
 the core comprises:
  a first portion extending from the coil-wound portion along the second surface of the battery; and
  a second portion extending from the first portion and along a second section of the peripheral surface of the battery opposing the first section.

Item 15 is an ear-worn electronic device configured to be worn by a wearer, comprising:
 a housing comprising a first end and an opposing second end, a first side and an opposing second side, and the first and second sides extending between the first and second ends, the first side configured to contact the wearer's head;
 a battery disposed within the housing proximate the first end;
 an acoustic receiver or an acoustic receiver connector disposed within the housing proximate the second end;
 electronics including a near-field magnetic induction (NFMI) radio disposed in the housing;

a magnetic antenna situated in or on the housing and coupled to the NFMI radio, the antenna comprising a core and a coil wound around a portion of the core; and a magnetic shield positioned between the antenna and a region of the second side of the housing, the magnetic shield configured as a low reluctance path to a source of magnetic noise impinging on the second side of the housing.

Item 16 is the device of item 15, wherein the magnetic shield is positioned to redirect the magnetic noise away from a coil aperture of the antenna.

Item 17 is the device of item 15, wherein the antenna comprises a core having a complex shape, the core comprising a closed end oriented toward the second side of the housing and an open end oriented toward the first side of the housing.

Item 18 is the device of item 15, wherein the antenna comprises a core having a complex shape, the core comprising a closed end oriented towards the electronics and an open end oriented towards the first end of the housing.

Item 19 is the device of item 15, wherein the core comprises a longitudinal axis comprising a first portion and at least a second portion that is non-parallel with respect to the first portion.

Item 20 is the device of item 15, wherein the core has a C-shape, a U-shape, a horseshoe shape or an L-shape.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An ear-worn electronic device configured to be worn by a wearer, comprising:
a housing comprising a first end and an opposing second end, a first side and an opposing second side, and the first and second sides extending between the first and second ends, the first side configured to contact the wearer's head;
a battery disposed within the housing proximate the first end;
an acoustic receiver or an acoustic receiver connector disposed within the housing proximate the second end;
electronics including a near-field magnetic induction (NFMI) radio disposed in the housing; and
a directional magnetic antenna situated in or on the housing and coupled to the NFMI radio, the antenna comprising a core having a complex shape and a coil wound around a portion of the core, the core comprising a closed end oriented toward a source of magnetic noise and an open end oriented away from the source of magnetic noise.

2. The device of claim 1, wherein the antenna is oriented within the housing to reduce induced voltages from noisy magnetic fields while not attenuating induced voltages from desired magnetic fields.

3. The device of claim 1, wherein:
the closed end of the core is oriented towards the second side of the housing; and
the open end of the core is oriented towards the first side of the housing.

4. The device of claim 1, wherein:
the closed end of the core is oriented towards the electronics; and
the open end of the core is oriented towards the first end of the housing.

5. The device of claim 1, wherein the coil-wound portion of the core is situated between the battery and the first end of the housing.

6. The device of claim 1, wherein the coil-wound portion of the core is situated between the electronics and the first end of the housing.

7. The device of claim 1, wherein the core comprises a longitudinal axis comprising a first portion and at least a second portion that is non-parallel with respect to the first portion.

8. The device of claim 1, wherein the core comprises a curved longitudinal axis.

9. The device of claim 1, wherein the core has a C-shape, a U-shape, a horseshoe shape or an L-shape.

10. The device of claim 1, wherein:
the battery comprises a first surface facing the first side of the housing, a second surface facing the second side of the housing, and a peripheral surface between and connecting with the first and second surfaces; and
the core comprises:
a first portion extending from the coil-wound portion along the first surface of the battery; and
a second portion extending from the coil-wound portion along the second surface of the battery.

11. The device of claim 10, wherein:
the coil-wound portion comprises a ferrite rod; and
each of first and second portions of the core comprises a ferrite-loaded elastomer, ferromagnetic material or mu-metal.

12. The device of claim 10, wherein:
the first portion of the core comprises a first electrical contact configured to electrically connect with the first surface of the battery; and
the second portion of the core comprises a second electrical contact configured to electrically connect with the second surface of the battery.

13. The device of claim 1, wherein:
at least some of the electronics or the acoustic receiver is disposed in an enclosure comprising high permeability material;
the coil-wound portion is situated adjacent the battery; and
the core comprises a strap comprising high permeability material extending from the coil-wound portion, along the second side of the housing, and connecting to the enclosure.

14. The device of claim 1, wherein:
the battery comprises a first surface facing the first side of the housing, a second surface facing the second side of the housing, and a peripheral surface between and connecting with the first and second surfaces;
the coil-wound portion is situated adjacent a first section of the peripheral surface of the battery; and
the core comprises:
a first portion extending from the coil-wound portion along the second surface of the battery; and
a second portion extending from the first portion and along a second section of the peripheral surface of the battery opposing the first section.

15. An ear-worn electronic device configured to be worn by a wearer, comprising:
a housing comprising a first end and an opposing second end, a first side and an opposing second side, and the first and second sides extending between the first and second ends, the first side configured to contact the wearer's head;

a battery disposed within the housing proximate the first end;

an acoustic receiver or an acoustic receiver connector disposed within the housing proximate the second end;

electronics including a near-field magnetic induction (NFMI) radio disposed in the housing;

a magnetic antenna situated in or on the housing and coupled to the NFMI radio, the antenna comprising a core and a coil wound around a portion of the core; and a magnetic shield positioned between the antenna and a region of the second side of the housing, the magnetic shield configured as a low reluctance path to a source of magnetic noise impinging on the second side of the housing.

16. The device of claim 15, wherein the magnetic shield is positioned to redirect the magnetic noise away from a coil aperture of the antenna.

17. The device of claim 15, wherein the antenna comprises a core having a complex shape, the core comprising a closed end oriented toward the second side of the housing and an open end oriented toward the first side of the housing.

18. The device of claim 15, wherein the antenna comprises a core having a complex shape, the core comprising a closed end oriented towards the electronics and an open end oriented towards the first end of the housing.

19. The device of claim 15, wherein the core comprises a longitudinal axis comprising a first portion and at least a second portion that is non-parallel with respect to the first portion.

20. The device of claim 15, wherein the core has a C-shape, a U-shape, a horseshoe shape or an L-shape.

* * * * *